United States Patent
Born

[11] 3,898,584
[45] Aug. 5, 1975

[54] GAS DYNAMIC LASER DEVICE AND METHOD OF OPERATING SUCH A DEVICE

[75] Inventor: Gunthard Born, Munich, Germany

[73] Assignee: Messerschmitt-Boelkow-Blohm GmbH, Munich, Germany

[22] Filed: Oct. 26, 1973

[21] Appl. No.: 410,181

[30] Foreign Application Priority Data
Nov. 9, 1972 Germany.............................. 2254798

[52] U.S. Cl............................. 331/94.5 G; 330/4.3
[51] Int. Cl............................ H01s 3/22; H01s 3/09
[58] Field of Search...................... 331/94.5; 330/4.3

[56] References Cited
UNITED STATES PATENTS
3,701,045  10/1972  Bronfin.............................. 331/94.5

OTHER PUBLICATIONS
Gerry, IEEE Sprectrum, November, 1970, pp. 51–58.

Yatsiv et al., IEEE J. of Quantum Electronics, Vol. 8, No. 2, Feb., '72, p. 161–163.

*Primary Examiner*—Robert J. Webster
*Attorney, Agent, or Firm*—Wolfgang G. Fasse; Willard W. Roberts

[57] ABSTRACT

The present invention relates to a gas dynamic laser device such as a $CO_2$-transmitter or amplifier wherein auxiliary pressure means are provided for maintaining the pressure in the combustion chamber at a substantially constant level even during outflow of the gas from the combustion chamber. The pressure control and thus the concomitant temperature control in the combustion chamber may be accomplished, for example, by adjusting or reducing the volume of the combustion chamber during the gas outflow, by introducing air under pressure into the combustion chamber, or by employing a specially constructed and arranged solid fuel pack which will sustain a strong gas flow into said combustion chamber.

18 Claims, 4 Drawing Figures

3,898,584

GAS DYNAMIC LASER DEVICE AND METHOD OF OPERATING SUCH A DEVICE

BACKGROUND OF THE INVENTION

The present invention relates to a gas dynamic laser device and to a method of operating such a device. More particularly the invention relates to a gas dynamic $CO_2$-transmitter or amplifier of the laser type. The operational gas in such a device comprises a mixture of nitrogen $N_2$, carbon dioxide $CO_2$, and water $H_2O$.

Prior art devices of this type employ a heat-up chamber for producing a heated $CO_2$—$N_2$ mixture. These heat-up chambers are commonly operated in such a manner that a combustible gas mixture is continuously supplied to the heat-up or combustion chamber during the operation of the laser device such as a laser transmitter. The gas mixture employed is usually a mixture of CO, $N_2$, $O_2$ and small additions of $H_2$ or $H_2O$. This type of operation, however, requires a rather costly gas supply and control or regulating system in which the pressure and the rate of flow of the several different gases must be accurately controlled. Further, the use of gaseous fuels requires undesirably large pipe or conduit cross sections. Another drawback of prior art gas operated devices is seen in the need for large gas storage containers especially where the laser device is to be operated for extended periods of time. Further, the gas supply system must be maintained under high pressure within the range of 10 to 1000 atm. Such large pressures call for large system dimensions and substantial wall thicknesses in order to assure the safe rigidity of the system. These requirements also increase the size and the weight of the apparatus.

Another type of conventional device operates in a pulse mode. In this type of device the heat-up is accomplished in such a manner that a combustible mixture, for example, CO and air are introduced into a chamber which is closed by a valve or a membrane. The mixture is ignited and thus hot $CO_2$ and $N_2$ are produced. When a predetermined pressure is reached, the valve is opened or the membrane ruptures and the hot gas mixture flows through jet means in the apparatus, whereby simultaneously an adiabatic cooling takes place and an inversion is produced. This type of device has the advantage of a light and simple structure of the heat-up or combustion chamber, because a continuous feed supply of the fuel is not necessary. However, this advantage is completely overshadowed by the disadvantage of a very low output or efficiency. This low output or efficiency is caused by the fact that the outflowing of the hot gas mixture results in a reduction of the gas density and in a pressure drop already in the combustion chamber, whereby the population or filling of the $CO_2$—00 L-level or of the $N_2$—$v$=1-level is substantially reduced.

OBJECTS OF THE INVENTION

In view of the above, it is the aim of the invention to achieve the following objects singly or in combination:

to provide a laser device of the gas dynamic type, for example, in the form of a $CO_2$-transmitter or amplifier which has a simple and compact construction and in which the excitation energy is substantially maintained;

to operate a laser device in such a manner that a full power output or efficiency is accomplished and, for example, diminishing of the population or filling of the $CO_2$—OO1-level is avoided during the entire pulse duration;

to provide auxiliary pressure means which will maintain the pressure in the combustion chamber at a predetermined constant level even during the outflow of the combustion gases; and to provide a fuel pack in which the shape and quantity of the pack components are correlated to each other with due regard to the desired radiation duration of the laser device.

SUMMARY OF THE INVENTION

According to the invention there is provided a laser device in which the gas mixture necessary for the laser operation is maintained in a predetermined ratio, for example, the $N_2$ proportion may be within a range of about 80 to 99% by volume, the proportion of $CO_2$ may be within the range of about 1 to 20% by volume and the proportion of $H_2O$ may be within the range of about 0.5 to 5% by volume, wherein auxiliary pressure means are provided for establishing or maintaining an additional pressure in the combustion chamber during the outflow of the gases, whereby the pressure is held at a predetermined substantially constant value between 10 and 1000 atm and whereby the temperature is also maintained at a substantially constant value between 1000° to 3000°K.

It has been found that employing an auxiliary pressure means for maintaining the pressure in the combustion chamber and thus also the temperature in the combustion chamber at a substantially constant level during the outflow of the gases results in a full power output or efficiency. Further, the present teaching avoids the reduction in the population or filling of the $CO_2$—OO1-level during the entire pulse duration.

According to the invention the auxiliary pressure means may comprise in one embodiment means for controlling the volume of the combustion chamber, for example, by means of an elastically yielding membrane which expands into the combustion chamber in response to pressure applied to the membrane. A piston may also be used for controlling the volume and thus the pressure in the combustion chamber. In still another embodiment the gas mixture may be supplied to the combustion chamber separately from the supply of air under pressure, whereby the pressurized air will sustain the pressure at a substantially constant level in the combustion chamber even during the outflow of the gases from the combustion chamber. Due to these features of the invention the temperature and pressure control in the combustion chamber is such that the excitation energy cannot be lost.

According to a still further embodiment of the invention, the pressure means are provided in the form of a solid fuel pack which is located or held in a portion of the combustion chamber and ignition means are provided for igniting the solid fuel pack. This particular embodiment has the advantage that it permits the freely selectable temperature and pressure control in a precise manner and in addition it simplifies the structure of the device and facilitates producing a relatively compact device. In this embodiment the solid fuel pack comprises fuel components and oxidizing components which are correlated in their shape and quantity to each other with due regard to the desired radiation duration of the laser device.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
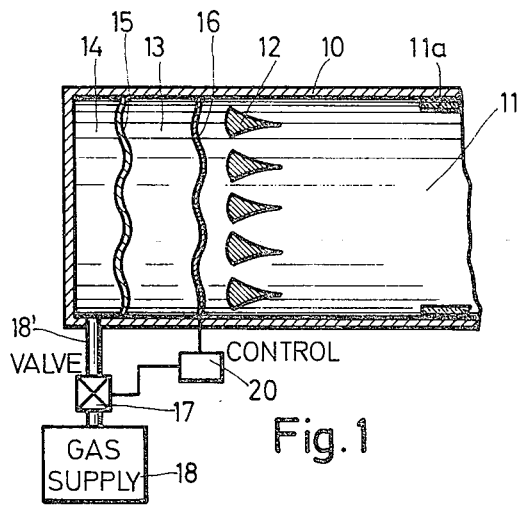
FIG. 1 illustrates in a somewhat schematic sectional view a laser device according to the invention, wherein an elastically yielding membrane is used as part of the auxiliary pressure means.
Figure 2:
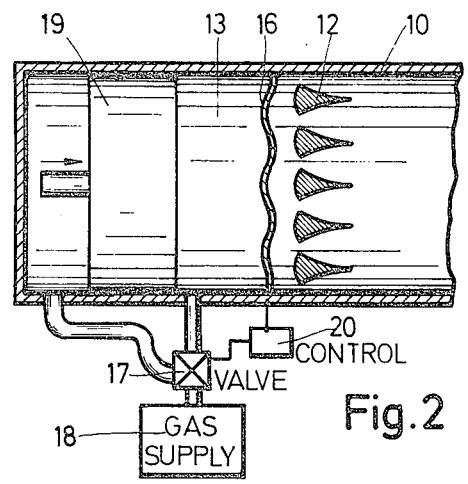
FIG. 2 illustrates an embodiment similar to that of FIG. 1 employing a piston as part of the auxiliary pressure supply means.

The same elements have been designated by the same reference numerals in all four embodiments. Thus, all four embodiments shown in FIGS. 1 to 4 illustrate a simplified, schematic embodiment of a gas dynamic laser device such as a $CO_2$-transmitter or amplifier having a housing 10 which contains a resonance chamber 11 and a combustion chamber 13 separated from each other by a set of closely spaced jet or nozzle means 12, which constitute flow means for the gases from the combustion chamber 13 into the resonance chamber 11. In the embodiment of FIGS. 1 and 2 a bursting membrane 16 is located upstream of the nozzle means 12, that is, adjacent to the combustion chamber 13. This bursting membrane 16 which may also be replaced by a valve means or the like, will burst or rupture in response to the reaching of a predetermined pressure of the gas mixture in the combustion chamber to release the outflow of the gas mixture through the nozzles 12.

In the embodiment of FIG. 1 a pressure chamber 14 is separated from the combustion chamber 13 by means of an elastically yielding membrane 15 which constitutes part of the pressure means or auxiliary pressure means provided according to the invention. Gas under pressure is supplied into the pressure chamber 14 from a gas supply tank 18 via a pipe 18'. A valve 17 is located in the pipe or conduit 18'. Conventional control means 20 including sensor means connected to the combustion chamber are operatively connected to the valve 17 to control the valve in response to the pressure in the combustion chamber 13. Thus, as soon as the pressure in the combustion chamber 13 has reached the above mentioned predetermined pressure which is freely selectable by selecting the respective rupture point of the bursting membrane 16 or by selecting the respective response point of a pressure responsive valve which may replace the membrane 16, the membrane 16 will burst or the valve will open. Simultaneously, the valve 17 is opened through the control means 20 and gas under pressure from the gas supply 18 flows into the pressure chamber 14 thereby pressing the elastically yielding membrane 15 toward the nozzle 12, whereby the volume of the combustion chamber 13 is reduced and the pressure in the combustion chamber maintained at a constant level even during the outflow of the gases. The pressure in the supply 18 is at least as high as the pressure in the combustion chamber, preferably the auxiliary pressure is higher than the pressure in the combustion chamber.

The embodiment of FIG. 2 operates basically in the same manner as that of FIG. 1. Here again, in accordance with the present teaching, the pressure in the combustion chamber 13 is maintained constant during the outflow of the gases through the nozzles or jets 12. This is accomplished by a piston 19 which again reduces the volume of the combustion chamber 13 under the direct control of the control means 20 which, for example, may comprise a conventional servo-mechanism responsive to the rupture of the membrane 16. As soon as the membrane 16 ruptures, the control means 20 will move the piston 19 in the direction of the arrow shown in FIG. 2. The pressurized gas supply 18, and valve 17 may be employed for restoring the piston 19 into its original position.

Figure 3:
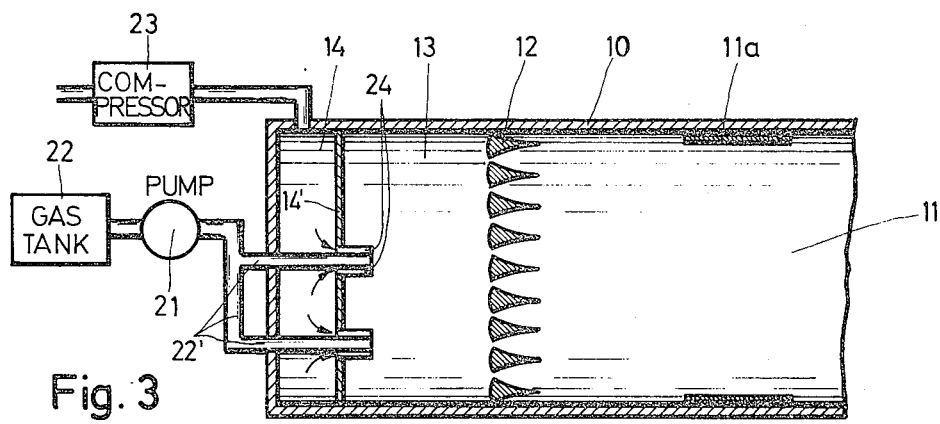
FIG. 3 illustrates a further embodiment wherein the auxiliary pressure supply comprises an air compressor.

FIG. 3 illustrates a further embodiment in which the auxiliary pressure is supplied to the pressure chamber 14 through a compressor 23, for example, an air compressor. Here the pressure chamber 14 is separated from the combustion chamber 13 by means of a solid wall 14' provided with a plurality of apertures 24, for example, in the form of slots or the like, through which the air under pressure flows from the pressure chamber 14 into the combustion chamber 13. The fuel gas mixture is supplied from the gas tank 22 through conduits 22' preferably extending through the pressure chamber 14 and through the apertures 24. A pump 21 is provided in the conduits 22' for injecting the $CO_2$ and $N_2$ into the combustion chamber 13. The compressor 23 operates simultaneously to force air under pressure into the pressure chamber 14, and as mentioned, the air moves under high pressure through the apertures 24 into the combustion chamber 13 simultaneously with the fuel gases from the gas tank 22. By the arrangement shown in FIG. 3, the fuel gases and air are mixed and atomized, whereby the combustion efficiency is even improved. Incidentally, the compressor may take the air from the atmosphere.

In the embodiment of FIG. 3 the pressurized air supplied into the combustion chamber 13 along with the fuel gas mixture assures that the pressure in the combustion chamber 13 will be maintained at a substantially constant pressure freely selectable within the range of 10 to 1000 atm. Simultaneously the temperature will be maintained at a substantially constant level within the range of about 1000° to 3000°K. The arrangement of FIG. 3 has the substantial advantage that only a proportion of the gas mixture, namely, the $CO_2$ and $N_2$ must be supplied from a gas tank 22 whereas the remaining proportion, namely the air, may be taken from the atmosphere. Of course, it will be appreciated that instead of the air compressor 23 a container could be used, for example, containing liquid air.

Figure 4:
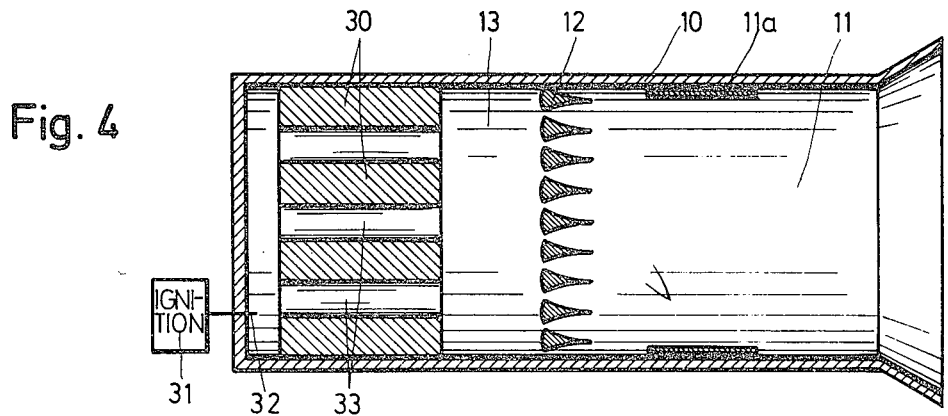
FIG. 4 illustrates an embodiment in which the auxiliary pressure supply means comprise an especially shaped solid fuel pack.

FIG. 4 illustrates a further embodiment according to the invention which is especially suitable for compact construction and thus useful where limited space is available, for example in air and space crafts. In this embodiment the auxiliary pressure is produced by means of a solid fuel pack 30. The composition of the solid fuel pack as well as its quantity and burning speed are dimensioned so that the gasses desired for the operation of the laser are provided in the necessary proportion relative to each other under a preselected pressure and at the desired temperature. Thus, the proportion of $N_2$ may be within the range of about 80 to 99% by volume, the proportion of $CO_2$ may be within the range of about 1 to 20% by volume and $H_2O$ may be within the range of 0.5 to 5% by volume. The pressure will be maintained at a predetermined substantially constant value within the range of 10 to 1000 atm and the temperature will be substantially constant at a value within the range of 1000° to 3000°K.

According to the invention the solid fuel pack 30 may be constructed and arranged with due regard to the above outlined purposes. Thus, by providing a particular shape, for example, by providing slots or holes 33 the fuel pack 30 may be constructed so that during the combustion a strong gas flow will be generated along the surface of the fuel pack. Such gas flow will accelerate the intermixture of the gases and the erosive combustion of the laser gas mixture. The composition of the solid fuel pack 30 may, for example, comprise a homogeneous mixture of fuel components and oxidizer components. These components may be provided in the form of a granular material which is homogeneously mixed. The arrangement of the components may also be in a heterogeneous manner, whereby layers of the components are stacked to form the solid fuel pack 30. The fuel component may, for example, comprise $C_2N_2$, $C_6N_4$ or other cyanogen compounds suitable for the present purposes. The oxidizer component may comprise, for example, a nitrogen oxide such as $N_2O$, $NO_2$, $N_2O_2$ and so forth. The solid state of the fuel pack may be assured, for example by cooling to a temperature below the melting or sublimation temperature. It is also possible to provide the oxidizer and fuel components intermixed or in solution with other solid carrier substances such as polyurethane or polyvinyl.

The fuel in a modification of the invention may also comprise a mono-molecular compound which is metastable and which preferably comprises the atoms N, O and C, so that the decomposition may be started by means of an ignition, whereby the energy freed by the decomposition is sufficient for heating up the decompositioned products $CO_2$, $N_2$, and $H_2O$. Thus, an ignition means 31 is schematically illustrated in FIG. 4. Such conventional ignition means comprise an ignition electrode 32 reaching into the housing 10 of the laser device for igniting the solid fuel pack 30.

Incidentally, the elastically yielding membrane 15 may be made of Teflon (RTM), rubber, metal foil or some other suitable material. The bursting membrane 16 may be made of similar materials. Such membranes are known in the art.

Incidentally, in the resonance chamber 11a there are shown conventional resonance reflectors or mirrors 11a.

Although the invention has been described with reference to specific example embodiments, it will be appreciated, that it is intended to cover all modifications and equivalents within the scope of the appended claims.

What is claimed is:

1. A method of operating a pulsed gas dynamic laser device, the gas of which is a mixture of $N_2$, $CO_2$, and $H_2O$, comprising supplying during the gas outflow additional pressure to the combustion chamber of said laser device for maintaining the pressure in the combustion chamber during the outflow of said gas at a substantially constant level within the range of 10 to 100 atm, wherein the gas temperature is simultaneously maintained at a substantially constant level within the range of 1000° to 3000°K during the gas outflow, and whereby the proportions of $N_2$, $CO_2$ and $H_2O$ are maintained within the following ranges: $N_2$ about 80 to 99% by volume, $CO_2$ about 1 to 20% by volume, and $H_2O$ about 0.5 to 5% by volume, whereby the efficiency is increased to such an extent that a population decrease of the $CO_2$—OOL-level is avoided during the entire pulse duration.

2. In a pulsed gas dynamic laser device utilizing for its operation a gas mixture, said device including a housing, a resonance chamber in said housing, a combustion chamber in said housing and gas flow means interconnecting said chambers, the improvement comprising pressure maintaining means and means operatively associating said pressure maintaining means with said combustion chamber for maintaining the gas pressure in said combustion chamber at a substantially constant level during the entire outflow of the gas from said combustion chamber into said resonance chamber through said flow means, and wherein said gas mixture comprises $N_2$, $CO_2$ and $H_2O$, wherein said substantially constant level gas pressure is within the range of 10 to 100 atm in said combustion chamber and wherein said constant gas pressure provides a substantially constant combustion temperature within the range of 1000° to 3000°K, whereby the proportions of said gas mixture of $N_2$, $CO_2$, and $H_2O$ are maintained within the following ranges: $N_2$ about 80 to 99% by volume, $CO_2$ about 1 to 20% by volume, and $H_2O$ about 0.5 to 5% by volume, whereby the efficiency is increased to such an extent that a population decrease of the $CO_2$—OOL-level is avoided during the entire pulse duration.

3. The pulsed gas dynamic laser device according to claim 2, wherein said pressure means comprise volume adjusting means located in said housing adjacent to said combustion chamber, drive means, and means operatively connecting said drive means to said volume adjusting means for adjusting the volume of said combustion chamber and thereby the pressure in said combustion chamber.

4. The pulsed gas dynamic laser device according to claim 3, wherein said volume adjusting means comprise a pressure chamber in said housing, elastically yielding membrane means located in said housing and separating said pressure chamber from said combustion chamber, said drive means comprising pressure supply means, said means operatively associating said pressure means with said combustion chamber comprising conduit means connecting said pressure supply means to said pressure chamber, and valve means in said conduit means for admitting fluid under pressure into said pressure chamer from said pressure supply means whereby the elastically yielding membrane expands into said combustion chamber.

5. The pulsed gas dynamic laser device according to claim 4, further comprising control means including pressure sensor means responsive to the pressure in said combustion chamber and operatively connected to said valve means for controlling the valve means in response to the pressure in the combustion chamber.

6. The pulsed gas dynamic laser device according to claim 3, wherein said volume adjusting means comprise a piston movably positioned in said housing, said drive means comprising control means including pressure sensor means responsive to the pressure in said combustion chamber and power means coupled to said piston and operatively associated with said sensor means for moving said piston in said housing into said combustion chamber.

7. The pulsed gas dynamic laser device according to claim 6, further comprising pressure supply means, conduit means connecting said pressure supply means to said combustion chamber, and valve means in said conduit means.

8. The pulsed gas dynamic laser device according to claim 2, wherein said pressure means comprise a solid fuel pack, said means operatively associating said pressure means with said combustion chamber including a portion of said combustion chamber in which said solid fuel pack is located, said apparatus further comprising ignition means connected to said device for igniting said solid fuel pack.

9. The pulsed gas dynamic laser device according to claim 8, wherein said solid fuel pack comprises a predetermined shaped which facilitates a strong gas flow along the surface of the solid fuel pack.

10. The pulsed gas dynamic laser device according to claim 9, wherein said predetermined shape includes slots or holes extending from one end to the other through said solid fuel pack.

11. The pulsed gas dynamic laser device according to claim 8, wherein said solid fuel pack comprises an oxidizer component and a solid fuel component.

12. The pulsed gas dynamic laser device according to claim 11, wherein said solid fuel component is a cyanogen compound.

13. The pulsed gas dynamic laser device according to claim 11, wherein the shape and quantity of said oxidizer component and of said solid fuel component are combined with each other with due regard to the desired duration of radiation of said laser device.

14. The pulsed gas dynamic laser device according to claim 11, wherein said solid fuel pack further comprises a solid carrier substance.

15. The pulsed gas dynamic laser device according to claim 2, further comprising a pressure chamber in said housing, wall means separating said pressure chamber from said combustion chamber, said pressure means comprising an air pressure means and means for operatively connecting said air pressure means to said pressure chamber, said means operatively associating said air pressure means with said combustion chamber comprising jet means extending through said wall means from said pressure chamber to said combustion chamber, whereby air under pressure is supplied through said jet means from said pressure chamber into said combustion chamber to sustain a substantially constant pressure in said combustion chamber when the gas flows out of said combustion chamber, said device further comprising means for supplying said gas mixture into said combustion chamber.

16. The pulsed gas dynamic laser device according to claim 15, wherein said gas mixture supply means comprise a gas tank, pipe means connected to said gas tank and extending through said jet means into said combustion chamber, and pump means connected to said pipe means.

17. The pulsed gas dynamic laser device according to claim 16, wherein said jet means comprise slotted inserts in said wall means, said pipe means extending through said slotted inserts.

18. The pulsed gas dynamic laser device according to claim 15, wherein said air pressure means comprise a compressor or a liquid air supply.

* * * * *